US006024473A

United States Patent [19]

Fadel

[11] Patent Number: 6,024,473

[45] Date of Patent: Feb. 15, 2000

[54] MOTOR VEHICLE HEADLIGHT REFLECTOR HAVING LATERALLY JUXTAPOSED ZONES, A HEADLIGHT CONSTRUCTED THEREFROM AND A METHOD OF MAKING THE REFLECTOR

[75] Inventor: Kamislav Fadel, Pantin, France

[73] Assignee: Valeo Vision, Bobigny, France

[21] Appl. No.: 09/025,914

[22] Filed: Feb. 19, 1998

[30] Foreign Application Priority Data

Feb. 21, 1997 [FR] France .................................... 9702091

[51] Int. Cl.[7] ........................................ B60Q 1/00

[52] U.S. Cl. .......................... 362/516; 362/517; 362/518; 362/348; 362/297; 362/346

[58] Field of Search .................................... 362/516, 517, 362/518, 348, 297, 346

[56] References Cited

U.S. PATENT DOCUMENTS

| | | | |
|---|---|---|---|
| 1,235,276 | 7/1917 | Wood | 362/516 |
| 1,621,585 | 3/1927 | Godley | 362/348 |
| 1,653,142 | 12/1927 | Zorger | 362/348 |
| 5,086,376 | 2/1992 | Blusseau | 362/518 |
| 5,132,847 | 7/1992 | Collot | 362/336 |
| 5,416,671 | 5/1995 | Uchida | 362/518 |
| 5,483,430 | 1/1996 | Stapel et al. | 362/517 |

FOREIGN PATENT DOCUMENTS 44 19 562 12/1994 Germany .

OTHER PUBLICATIONS

French Search Report dated Nov. 1997.

*Primary Examiner*—Sandra O'Shea
*Assistant Examiner*—Ronald E. DelGizzi
*Attorney, Agent, or Firm*—Morgan & Finnegan, L.L.P.

[57] ABSTRACT

A motor vehicle headlight reflector and a headlight constructed therefrom, wherein the reflector comprises a plurality of laterally juxtaposed zones bounding transition lines with a break of slope. Each zone has a smooth reflective surface and is adapted to spread light horizontally between two limits obtained in the immediate vicinity of the transition lines. The limits of horizontal spread in each zone varies progressively with displacement along the transition line concerned. The invention also includes a method of making the motor vehicle headlight reflector.

16 Claims, 9 Drawing Sheets

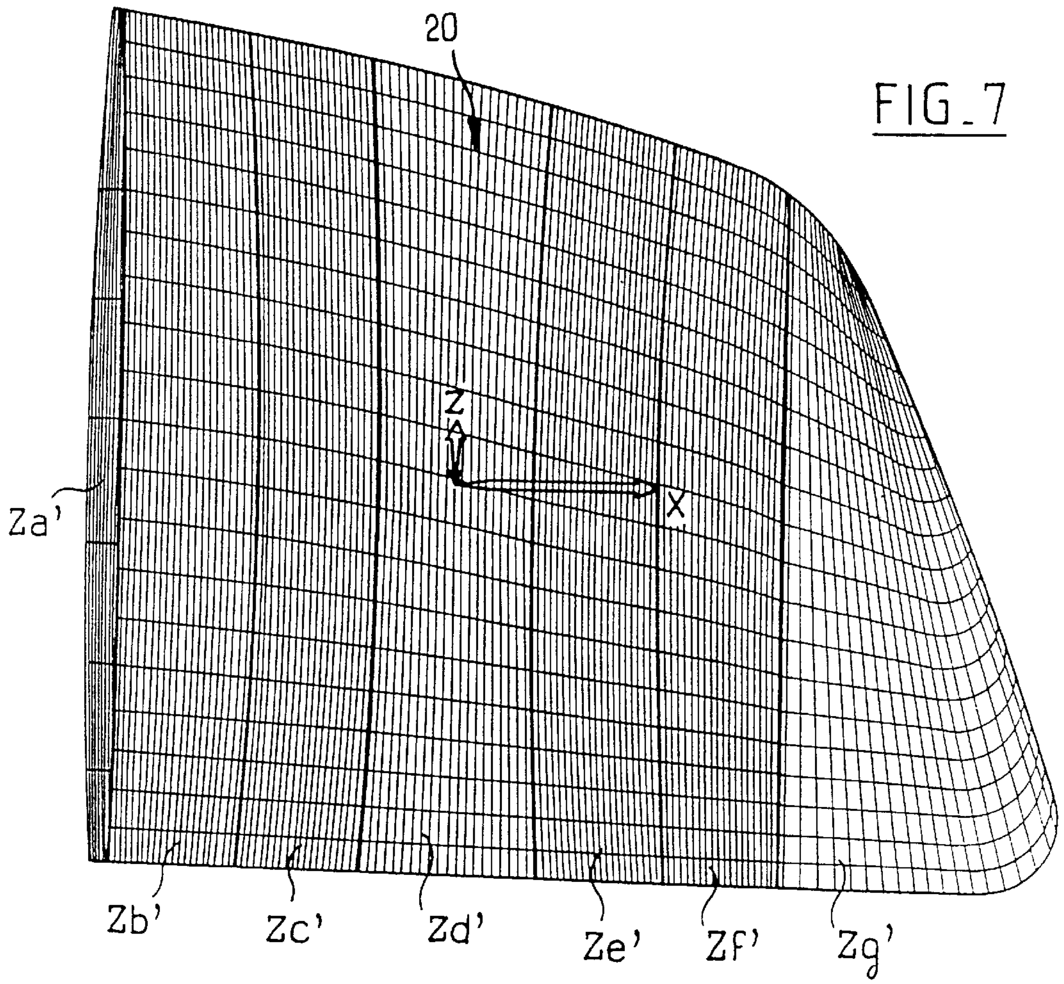
FIG_7
FIG_8a
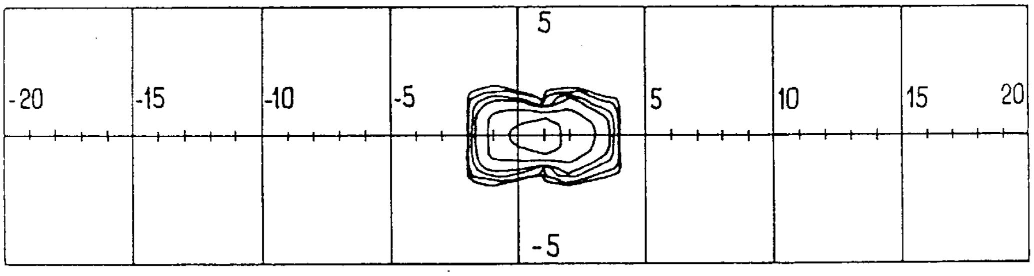
FIG_8b
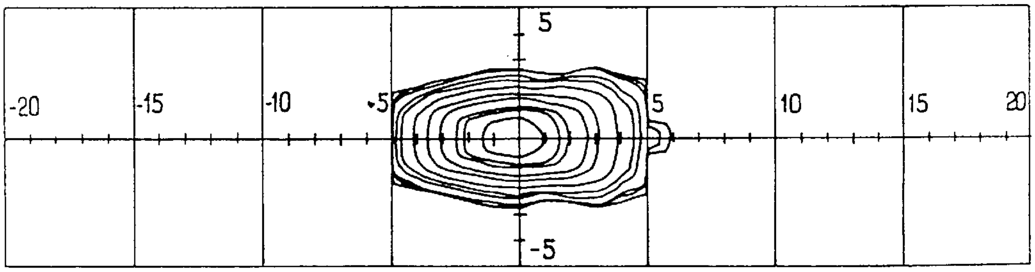

MOTOR VEHICLE HEADLIGHT REFLECTOR HAVING LATERALLY JUXTAPOSED ZONES, A HEADLIGHT CONSTRUCTED THEREFROM AND A METHOD OF MAKING THE REFLECTOR

FIELD OF THE INVENTION

The present invention relates in general terms to motor vehicle headlights. More precisely, the invention relates to headlights having a light source, a reflector and a cover lens, the reflector comprising a plurality of laterally juxtaposed zones with smooth reflective surfaces.

BACKGROUND OF THE INVENTION

It is already known to provide headlights which are capable of producing by themselves chopped beams, such as dipped beams or beams for penetrating fog, which are bounded at the top by a well-defined cut-off line. In this connection, reference can be made to French patent specifications Nos. FR 2 536 502A and FR 2 536 503A, both in the name of Valeo Vision S.A. In these known headlights, the required width of the beam is obtained with the use of prisms and striations which are formed on the cover glass of the headlight. The design of these light-deflecting elements is generally made empirically, step by step, in such a way that the beam will have a satisfactory final photometry.

The above mentioned Company subsequently developed reflectors in which the reflective surfaces were designed to give the beam a certain width behind, i.e. upstream of, the cover lens or glass of the headlight. The cover glass in that case is then either smooth or with only a very slight light-deflecting capability, a desirable feature, firstly in terms of styling, and secondly from the optical point of view. In this latter connection, the inclination of the cover glasses in modern headlights makes it rather difficult to design the cover lens in such a way that it will provide the required horizontal spread of the beam. This state of the art is described in French patent specifications Nos. FR 2 609 146A, FR 2 609 148A, FR 2 639 888A and FR 2 664 677A.

In order to give better control of the lateral spread given to the beam, special striations have been designed, which are applied directly on the reflective surface of the reflector, in the manner described in French patent specification No. FR 2 732 446A. However, manufacture of such headlights on an industrial scale gives rise to certain difficulties. More precisely, to the extent that the horizontal spread of the beam is controlled—there being a tendency to require better and better control of this spread—the side edges of the beam become excessively sharp, so that the light disappears relatively suddenly beyond a certain angle of deflection on the right and on the left. In addition, various manufacturing errors, especially as regards the deposit of varnish on the surfaces, give a comb-like appearance to the beam in the region of these side edges.

These two errors become even more perceptible when viewed by a person using peripheral vision.

In addition, reflectors with smooth surfaces and reflectors with irregularly striated surfaces are not always considered desirable by styling designers, who nowadays look for headlight reflectors with a more original appearance, while at the same time they require to be able to produce satisfactory photometry in the beams without relying on the cover lens.

DISCUSSION OF THE INVENTION

An object of the present invention is to overcome the above mentioned drawbacks and limitations present in the state of the art.

More precisely, the invention aims to provide a novel headlight which is capable of producing a beam with appropriate light distribution, without using the cover lens for this purpose.

According to the present invention in a first aspect, a motor vehicle headlight, comprising a light source, a reflector and a cover lens, the reflector having a plurality of zones with smooth reflective surfaces, juxtaposed laterally to each other and bounded by transition lines with a break of slope, each of these zones being adapted to spread the light horizontally between two limits obtained in the immediate vicinity of the transition lines, wherein the limit of the horizontal spread of each zone varies progressively with displacement along the transition line concerned.

According to a preferred feature of the invention, each of the reflective surfaces in at least some of the zones is defined on a non-parabolic horizontal generatrix and has a vertical cross section which gives controlled upward and downward progressive defocalization, and the defocalization of the reflective surfaces of the various zones are adjusted in such a way as to obtain the progressive variation in the limits of spread.

According to another preferred feature of the invention, along some of the transition lines between the reflective surfaces, the limit of horizontal spread in at least one adjacent zone diminishes progressively upwardly and downwardly from the center of the reflector.

According to another preferred feature of the invention, the horizontal generatrices are designed to give spreading by divergence. Preferably with this arrangement, the horizontal generatrices in the various zones, and the positions of their transition lines, are such that, from the center towards the side edges of the reflector, the limits of horizontal spread in each of the zones diminishes progressively.

In this last mentioned arrangement, the horizontal spread obtained in each of the zones may be either symmetrical or asymmetrical on either side of the general direction of emission.

In some embodiments of the invention, the reflective surface of each of at least some of the zones gives a defocalization such that it puts all of the images of the light source below and essentially at the level of a horizontal cut-off line.

According to a further preferred feature of the invention with this last mentioned arrangement, the reflector includes at least one further zone which is juxtaposed laterally to the zones, the reflective surface of the said further zone being adapted to put all of the images of the light source below and essentially on a level with a further cut-off line which is offset with respect to the horizontal cut-off line. The further cut-off line may be offset either angularly or in terms of height.

According to the invention in a second aspect, a method of making a reflector for a motor vehicle headlight comprising the following steps:

- defining a plurality of reflective surfaces, each of which has a non-parabolic horizontal generatrix and vertical cross sections which give a progressive upward and downward controlled defocalization as compared to parabolic cross sections;
- adjusting the position of the horizontal generatrices and the defocalisation of each of the reflective surfaces, in such a way that they intersect, two by two, along transition lines joining an upper edge and a lower edge of the reflector, and in such a way that along the transition lines, the horizontal spread obtained from the reflective surfaces situated on either side varies in a regular manner;

machining a mold including, juxtaposed horizontally, zones which comprise the respective portions of the reflective surfaces that are delimited by the lines of intersection; and molding the reflector in the mold.

Preferably, the step of adjusting the position of the horizontal generatrices is performed as a function of the required position, in the lateral direction, of the transition lines between the different zones.

Preferably also, the step of adjusting defocalization is carried out as a function of the required magnitude of the variation in the horizontal spread along the transition lines.

Further features and advantages of the invention will appear more clearly on a reading of the following detailed description of some preferred embodiments of the invention, given by way of non-limiting example only and with reference to the accompanying drawings.

BRIEF DESCRIPTION OF THE DRAWINGS

FIG. 7 is a back view of a reflector in a second embodiment of the present invention.

FIG. 10*b* is a graph similar to that in FIG. 10*a* and shows the lateral distribution of light given along a horizontal cross section of the reflector offset in height with respect to the axial horizontal cross section to which FIG. 10*a* is related.

DESCRIPTION OF PREFERRED EMBODIMENTS OF THE INVENTION

Figure 1:
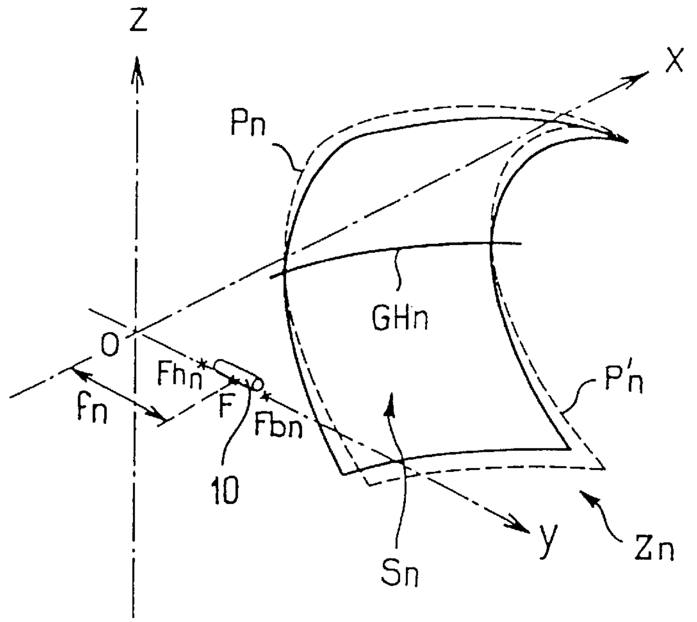
FIG. 1 is a perspective view showing the construction of a headlight reflector according to the present invention.

Reference is first made to FIG. 1, which shows three-dimensional cartesian coordinates in which 0X is horizontal and perpendicular to the optical axis, 0Y being the optical axis and 0Z being vertical.

A reflector according to the invention is, in general terms, formed by defining individually a plurality of reflective zones, which are juxtaposed laterally to each other, that is to say they are delimited by boundary lines which extend between the upper and lower edges of the reflector. In FIG. 1, the reflective surface Sn of a zone Zn of the reflector is generated by defining, first of all, in the region of this zone a horizontal generatrix GHn which is designed to give a predetermined lateral spread of the light, confined between two limits of spread. This horizontal generatrix may be part of a hyperbola, part of an ellipse, or even a segment of a straight line, and so on.

The profile of the reflective surface is derived from this generatrix, in such a way that it gives a defocalization in its vertical cross sections. The term "defocalization", as used in this specification, means variation in the position of the location from which an emitted ray is reflected in a horizontal plane parallel to the optical axis 0Y of the reflector.

Thus, in FIG. 1 the upper half of the surface Sn has a "high focus" Fhn, which is different from the focus F of notional purely parabolic sections Pn, Pn' which are indicated in broken lines for purposes of comparison, while its lower half has a "low focus" Fbn which is again different from F. The distance measured along the optical axis 0Y between the focus F and the high focus Fh can be called "high defocalization", while the corresponding distance between F and the low focus Fb can be called "low defocalization".

Defocalization, as defined above, is present in surfaces which are described, in particular, in French patent specifications Nos. FR 2 536 502A and FR 2 536 503A, both in the name of Valeo Vision S.A. However, the arrangements described in those specifications are limited to the case where the horizontal generatrix is parabolic. A more generic method, for producing such surfaces mathematically from a horizontal generatrix having any form whatsoever is described in detail in German patent specification DE 42 00 989A.

Thus the reflective surface Sn which will be obtained in the zone Sn is a surface which is capable of generating images of the source (in particular of an incandescent, generally cylindrical, filament) all of which are situated below a cut-off line, and which at the same time give a controlled spread of the images below this cut-off line, the horizontal generatrix being preferably so selected that this spread is also homogeneous. In addition, if the defocalization is such that the high focus Fhn and the low focus Fbn of the high and low vertical sections of the surface are respectively at the posterior end and the anterior end of the light source, then the images are essentially aligned below and level with the cut-off line.

In a limiting case, the value of defocalization can be made zero, the vertical sections of the surface being, in this case, parabolas with the focus F, or with a focus which is offset with respect to the point F. This approach may be used in particular for headlight main beams.

Figure 2:
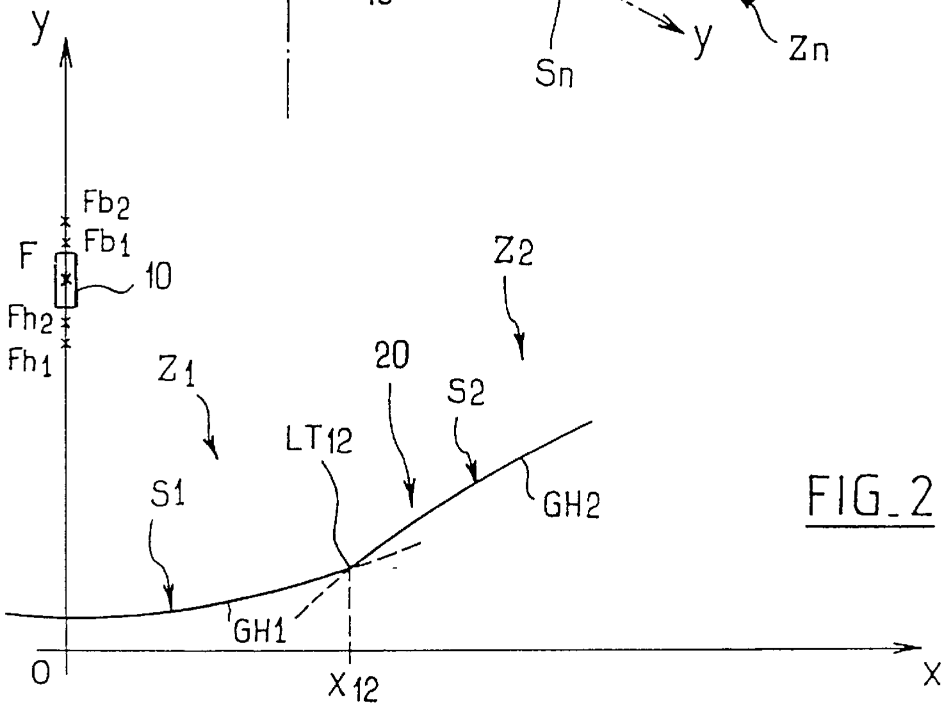
FIG. 2 is a view in horizontal axial cross section showing part of the reflector so obtained.

With reference now to FIG. 2, the construction of a reflector in accordance with the invention is achieved in two successive steps. One of the zones of the reflector is first defined in the manner explained above. This is preferably the zone that occupies the bottom of the reflector, and the parameters (and principally the form of the horizontal generatrix and the high and low defocalizations of the vertical cross sections of the reflective surface) are defined as a function of the size of the reflector and the required photometry in the wide part of the beam.

In accordance with an essential feature of the invention, adjacent zones, to left and right of the base zone, are then defined with their own parameters (in this example again, the form of the horizontal generatrix and the high and low defocalizations of its vertical cross section), firstly as a function of the positioning required for the light projected by these zones, and secondly (and above all) in such a way that the reflective surface of the adjacent zones intersects the reflective surface of the base zone along a transition line which has the following two essential features:

firstly, it must extend downwardly between the top and bottom edges of the reflector, and secondly, the lateral deflection provided by each of the reflective surfaces at the level of the transition line must not be constant, but must, on the contrary, vary regularly along that line.

FIG. 2 shows precisely the case in which a reflective surface S1 has been initially defined, where this surface is adapted to define a base zone Z1 of the reflector 20, the reflective surface of this zone having a horizontal generatrix GH1 with appropriate high and low defocalizations Fh1 and Fb1.

The reflective surface S2 of a zone Z2 is then defined, this surface having a horizontal generatrix GH2 and giving high and low defocalizations Fh2 and Fb2.

It will be understood that, by varying in particular the position of the horizontal generatrix GH2 along the optical axis 0Y, it is possible to proceed in such a way that, in the plane X0Y, the two reflective surfaces intersect at a point having a position X12 which is well defined so as to define the common boundary between the two zones Z1 and Z2 in this common plane X0Y. To the extent that the other parameters of the zone Z2 remain within reasonable limits, the two zones will in fact intersect along a transition line LT12 which passes through the position X12 at the level of the intersection plane X0Y, and which extends from the upper edge to the lower edge of the reflector.

Following another important feature of the invention, the exact trajectory of the transition line LT between the zones Z1 and Z2 over the height of the reflector is constructed by adjustment of the values of the high and low defocalisations in each of these zones.

For this purpose, various approaches may be adopted, but two in particular. The first of these approaches consists in varying the high and low foci Fh and Fb respectively, of the upper and lower portions of the reflective surface, in such a way that they have two identical first positions for the whole of one of the zones, and two second positions which are identical to each other but different from the first positions, for the whole of the other zone. This enables progressive inflection to be given to the transition line LT12, in a controlled way to the extent that it is displaced upwards or downwards from the plane X0Y, the inflection being towards the left or the right when the transition line is observed in projection in the vertical plane X0Z.

The second approach mentioned above consists in varying the position of the high and low foci, but in this case not zone by zone but continuously within a particular zone. In this way, the depthwise offsets of one zone with respect to its two adjacent zones can be adjusted independently of each other. The corresponding transition lines can therefore be given inflections independently of each other: preferably, the evolution of the high foci and/or the low foci within any one zone is such that the defocalization develops in a linear manner as a function of the next following position X.

It will also be observed that, since each transition between zones consists of the intersection of two surfaces which are generally not tangential to each other, no discontinuity of zero order is created between the reflective surfaces of the two zones. However, there is at the level of the transition a curve which, when the light is extinguished, enables the observer to differentiate clearly between the different zones, which is important from the aesthetic point of view.

It will also be noted that, due to the variations applied to the defocalisations, the transition line LT12 between the zones Z1 and Z2 follows, as a general rule, a trajectory which is to a greater or lesser extent curved and sinuous, and which has the property that it is coincident neither with a lateral isodeviation line (i.e. a line in which light is deflected by the same amount at any point along the line) of the zone Z1 nor with a lateral isodeviation line of the zone Z2. As a result, the width of each zone will vary progressively as a function of the next following position Z, and the maximum lateral spread obtained at the level of the transition line LT12 will vary progressively along this line. It follows that the phenomenon of sudden arrest of the part of the beam generated by each of the zones of the reflector, which is a classic drawback of reflectors with projected cylindrical striations, is avoided.

It will moreover be noted that by adjusting the position of the transition lines which delimit a given zone, it is easy to bias the spread of the light either towards the left or towards the right, the spread to a given side being smaller as the transition line concerned reduces the width of the zone along the axis 0X. On the other hand, the spread on a given side is greater if the transition line is such that the width of the zone increases.

Finally, it is clear that the variation in the high and low defocalizations leads to an offset in the position of the images of the filament on a projection screen, either upwards or downwards. In the case where the required beam must have a given cut-off, the changes in defocalization are of course chosen to be such that this cut-off beam continues to be present and defined with some accuracy. In other cases, the controlled defocalization can be made use of for the purpose of adjusting the distribution of the light in terms of the thickness of the beam.

The construction of the reflector is continued by defining, in the same way as before, a zone Z3 adjacent to the zone Z2 and dimensioned in such a way as to obtain a curved transition line LT23 extending to the required point X in the plane X0Y.

These steps can be repeated for as many zones as necessary in the left and right hand parts of the reflector.

The invention also enables a reflector to be made in which different laterally juxtaposed zones can be so dimensioned as to generate portions of different beams with great flexibility, so as to facilitate modelling of the definitive beam while obtaining a reflective surface which does not have any discontinuities of zero order. It is well known that such discontinuities set up optical anomalies. A further advantage is that the reflector has a surface which, when the lamp is extinguished, presents an appearance which is the same as that of a reflector having coarse, wide striations, this being relevant from the aesthetic point of view.

Preferably, the whole of the modelling of the beam is carried out on the reflector, with the front cover lens of the headlight (not shown) being preferably entirely smooth, or at least including only inactive or substantially inactive styling elements.

In addition, in order to match to the best possible extent the geometry of the parts of the vehicle that surround the headlight (for example side screens for masking a beam which is too wide, cover lens lugs which are liable to set up optical anomalies, and so on), it is preferably arranged that the horizontal generatrices of the central zones of the reflector are such that these zones give a high degree of spread of the light so as to give the beam its required width with the aid of large images of the source, while the lateral zones of the reflector have, by contrast, horizontal generatrices which hardly spread the light at all, thereby ensuring that the beam has a central core of concentration with the aid of smaller images of the filament. As to the intermediate zones, these provide intermediate lateral spread. In other words, the horizontal generatrices of the various zones are preferably less and less parabolic, the closer the zone is to the center of the reflector.

Figure 3:
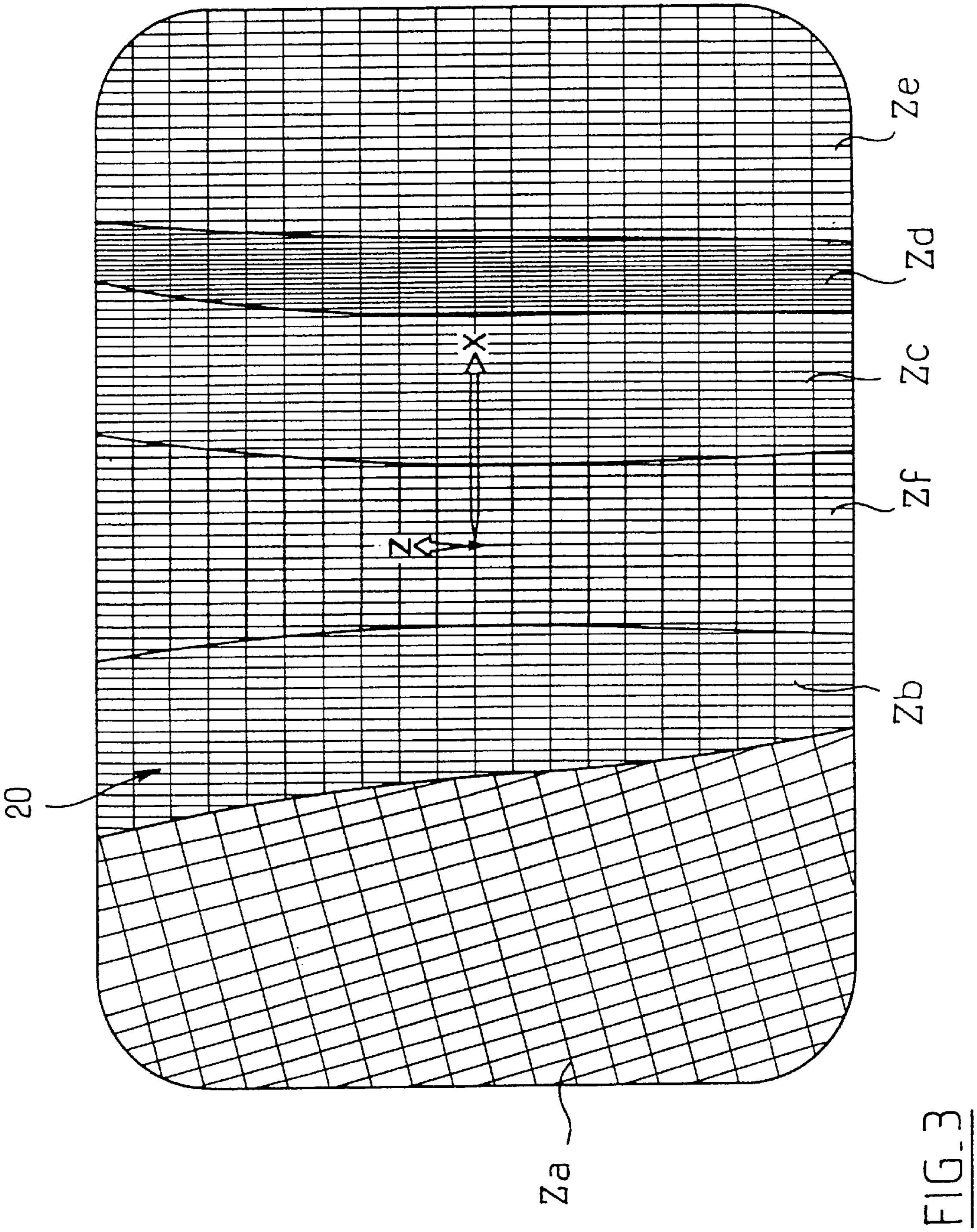
FIG. 3 is a back view of a reflector in a first embodiment of the present invention.

Reference is now made to FIG. 3, which shows a reflector for a European dipped-beam headlight, adapted for driving on the right and made generally in accordance with the present invention.

The mirror in FIG. 3 comprises six zones which are designed as follows (considering the six zones from left to right in the Figure):

- a left end zone Z*a,* the surface of which is such that it is capable of aligning the images of the source below and at the level of a cut-off line inclined at 15° above the horizontal;
- a first intermediate zone Z*b;*
- a base zone Z*f;*
- a second intermediate zone Z*c*; and
- two end zones Z*d* and Z*e.*

The zones Z*b* to Z*f* have surfaces capable of placing the images of the filament below and close to a non-inclined cut-off line.

It will be observed here that the method used for constructing the left end zone Z*a* is different from the method used for constructing the other zones, the difference being that the Cartesian reference frame used is rotated through 15° for the zone Z*a* as compared with the other zones.

Figure 4A:
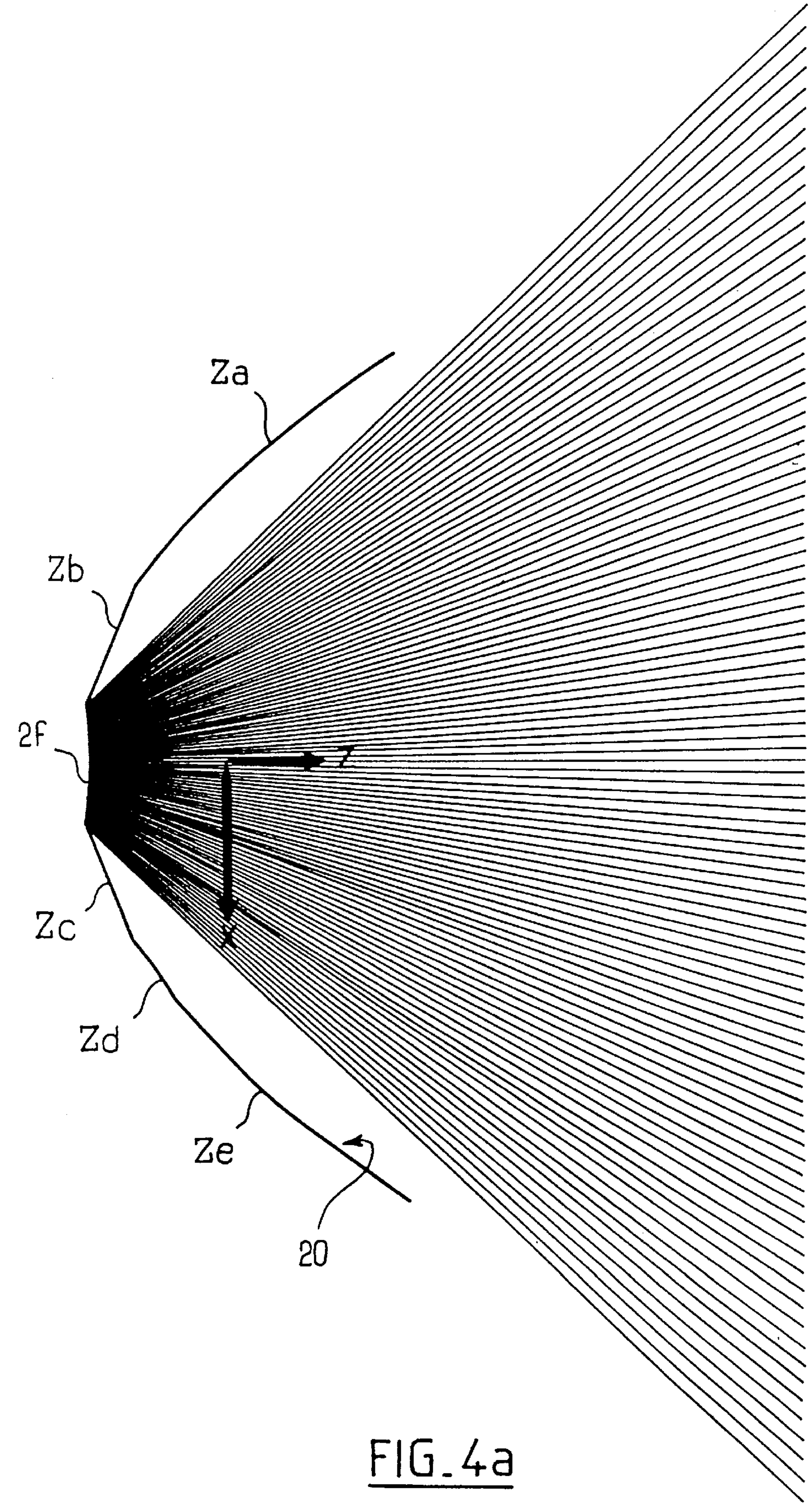
FIG. 4*a* is a plan view showing the optical behaviour of a central zone of the reflector shown in FIG. 3.
Figure 4B:
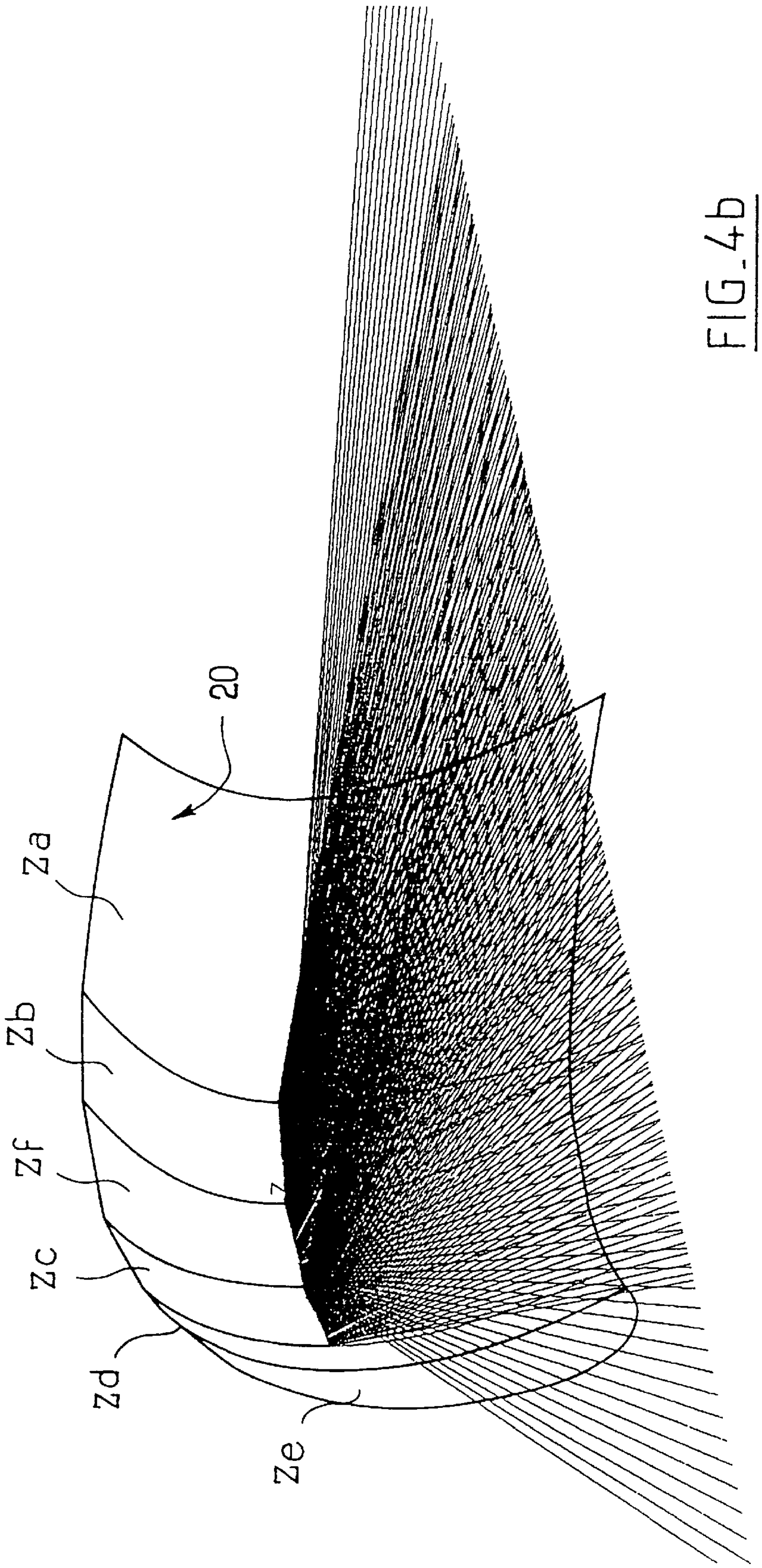
FIG. 4*b* is a perspective view showing the optical behaviour of three central zones of the reflector seen in FIG. 3.
Figure 5A:
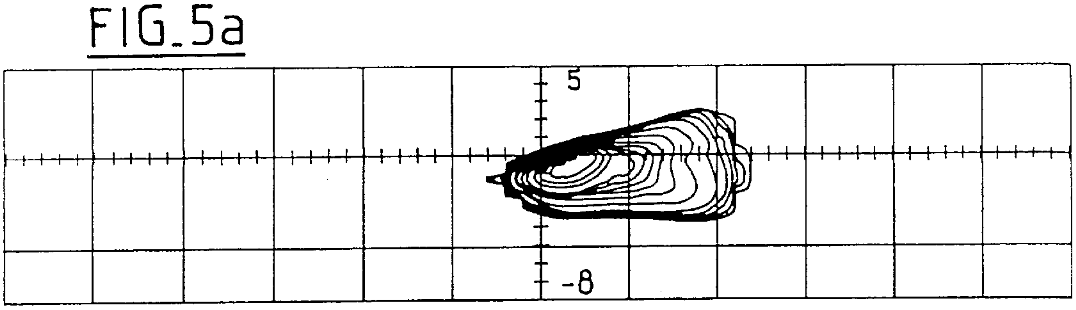
FIG. 5 comprises FIGS. 5*a* to 5*e*, each of which consists of a set of isolux curves on a projection screen, illustrating the optical behaviour of five different zones of the reflector of FIG. 3, without the headlight cover lens.
Figure 5B:
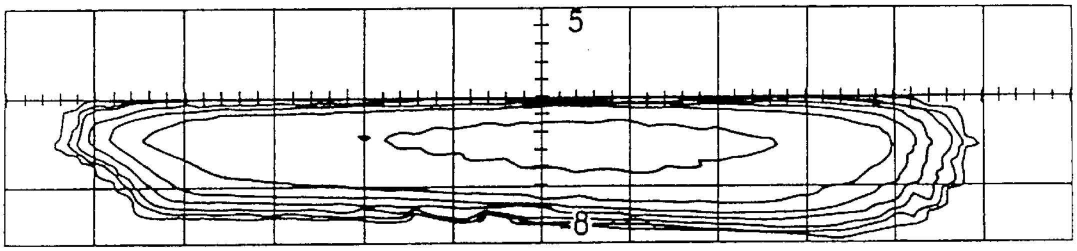
Figure 5C:
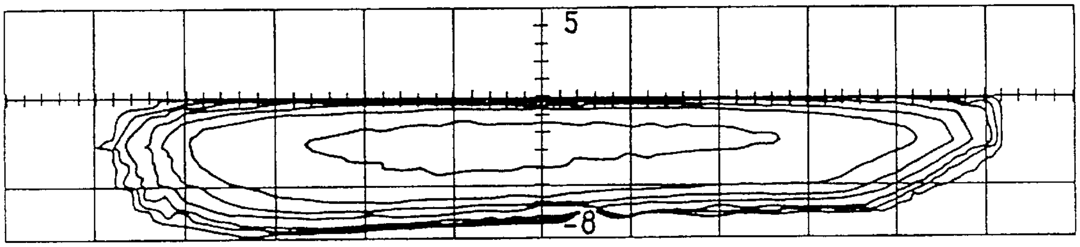
Figure 5D:
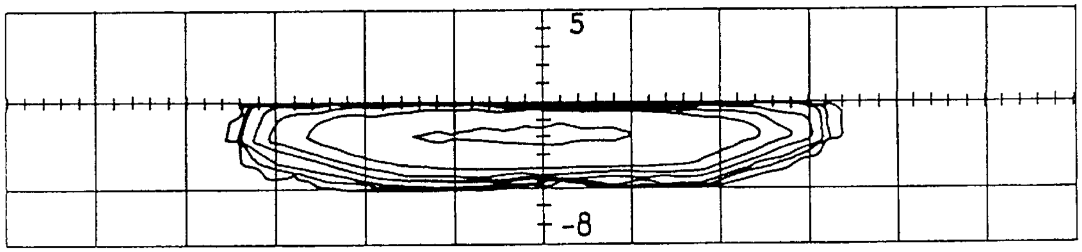
Figure 5E:
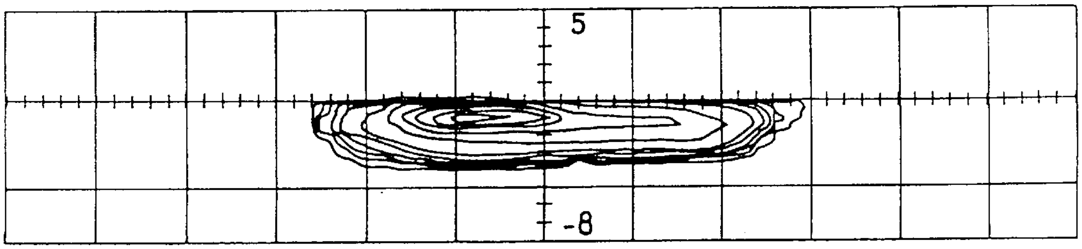

In this embodiment, the lateral spread provided by the various zones is reduced to the extent that the zone concerned is distant laterally from the optical axis. The lateral spread provided by the zone Z*f* is illustrated in FIG. 4*a,* while the lateral spread given by the zones Z*b*, Z*f* and Z*c* is shown in FIG. 4*b*.

The appearance of the portions of the beam generated by the zones Z*a* to Z*e* is shown in FIGS. 5*a* to 5*e* respectively. The numerical indications given in FIG. 5 represent the horizontal and vertical deflections in degrees. It will be noticed that each of the portions of the beam, for the reasons explained above, have wavy edges at the sides, which ensures homogeneous mixing of the various portions of the beam within the whole beam.

Figure 6:
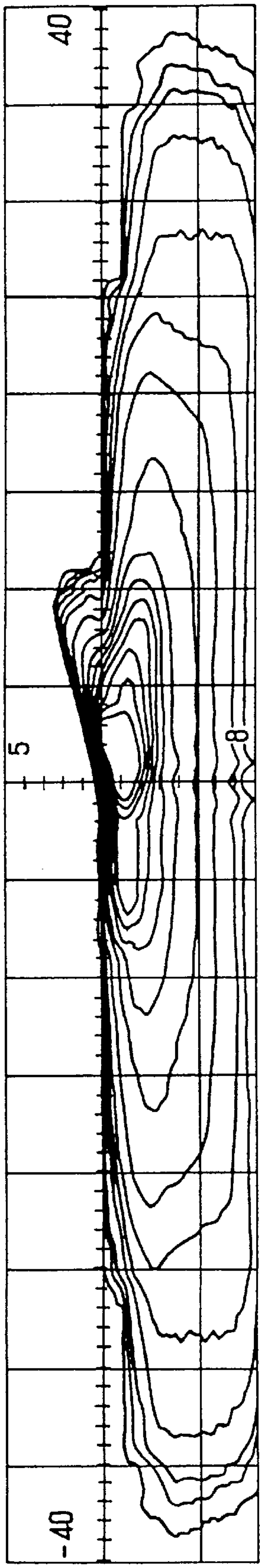
FIG. 6 again consists of a set of isolux curves, in this case showing the appearance of the beam generated by the whole of the reflector of FIG. 3 without the headlight cover lens.
Figure 8C:
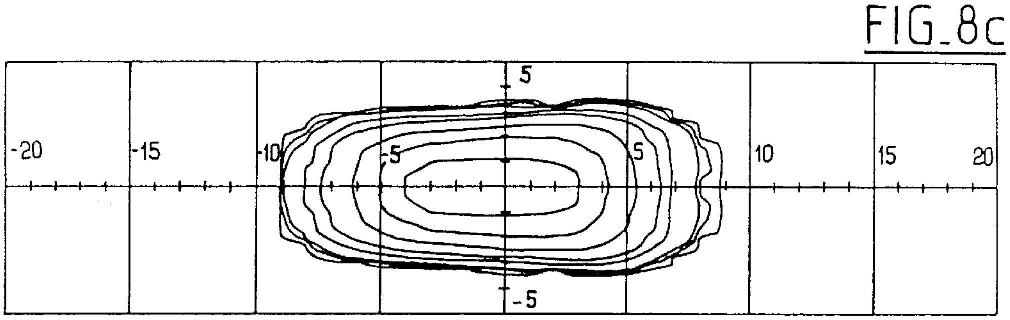
FIG. 8 comprises FIGS. 8*a* to 8*g*, each of which consists of a set of isolux curves on a projection screen, illustrating the optical behaviour of the seven different zones of the reflector seen in FIG. 7, in the absence of the headlight cover lens.
Figure 8D:
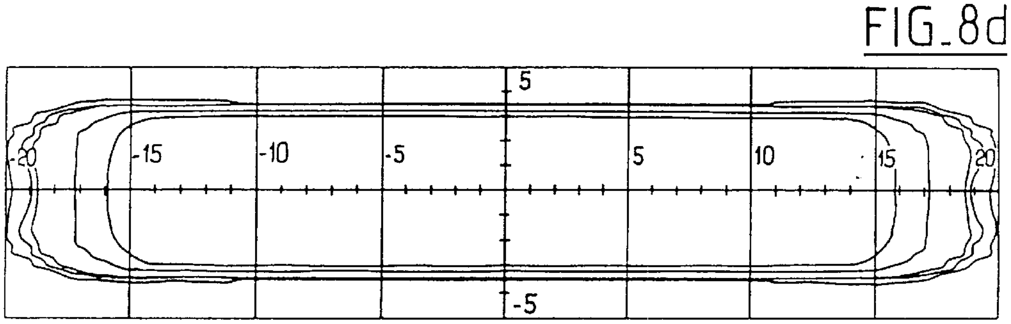
Figure 8E:
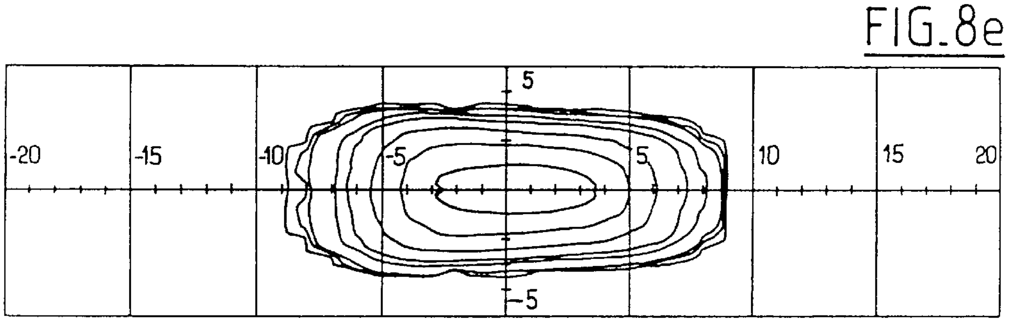
Figure 8F:
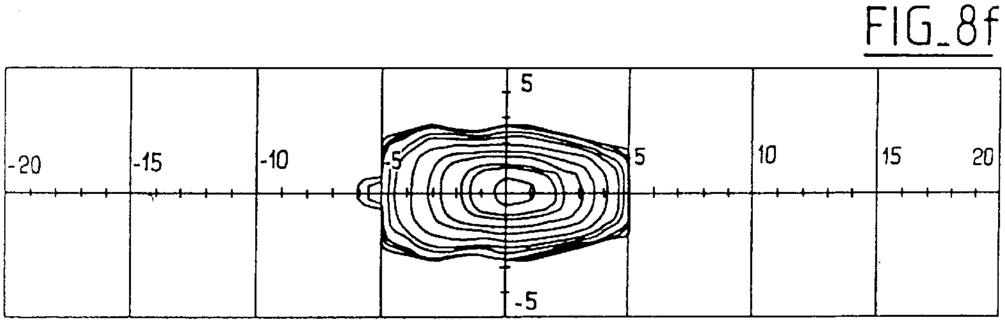
Figure 8G:
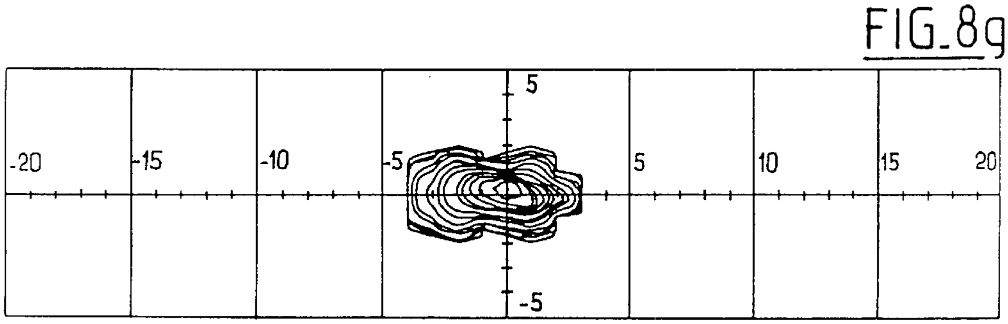

The appearance of this whole beam is shown in FIG. 6. From this it can be seen that the beam has a high concentration on the optical axis, while being very wide and having great homogeneity. It is also seen that, because of the design of the zone Z*f* as described above, the lateral or side edges of the beam are blurred, which avoids perturbations in the peripheral vision of the human eye.

It will also be noted that the portion of the beam which lies along the half cut-off line inclined at 15° upwardly is not prolonged excessively far along this half cut-off line. This enables the nearside of the road to be illuminated correctly without the drivers of vehicles being dazzled in their external rear view mirrors when being overtaken.

It will be understood that the invention enables chopped, or cut-off beams to be obtained which are adapted for various applications, mainly those of dipped headlight beams, and foglights, besides being adapted for various regulations. This flexibility is obtained by simple adjustment of the horizontal generatrices and the defocalization parameters used. In this connection it is preferable to design a reflector having a central zone Z*f* which is identical for all headlights, only the intermediate zones and the end zones being adapted to define the desired cut-off.

Reference is now made to FIG. 7, which shows a reflector of a headlight in another embodiment of the present invention. In this case, the reflective surfaces of the various zones Z*a*' to Z*g*' have adapted defocalizations, and preferably zero defocalizations. Here again, the lateral spreads obtained in the various zones are smaller to the extent that the zones concerned are further away laterally from the optical axis.

Figure 9:
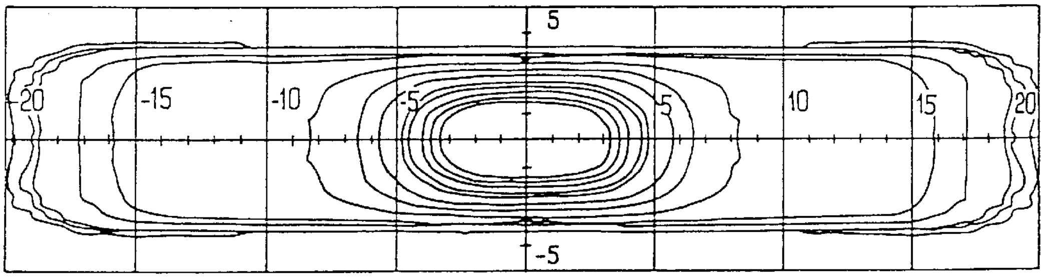
FIG. 9 against consists of a set of isolux curves, showing the appearance of the beam generated by the whole of the reflector of FIG. 7 in the absence of the cover lens.

The appearance of the various portions of the beam set up by these different zones is shown in FIG. 8, in which FIGS. 8*a* to 8*g* respectively correspond to the seven zones shown in FIG. 7. FIG. 9 shows the beam as a whole. Here again the beam is very wide but with great homogeneity, while having a core of very high concentration. The thickness of the beam is essentially constant, a feature which is again of advantage in terms of visual comfort.

Thus, the present invention enables headlights to be made which, while generating beams which are entirely different from each other, are all able to present the same appearance when extinguished. This is of particular advantage in terms of styling.

Figure 10A:
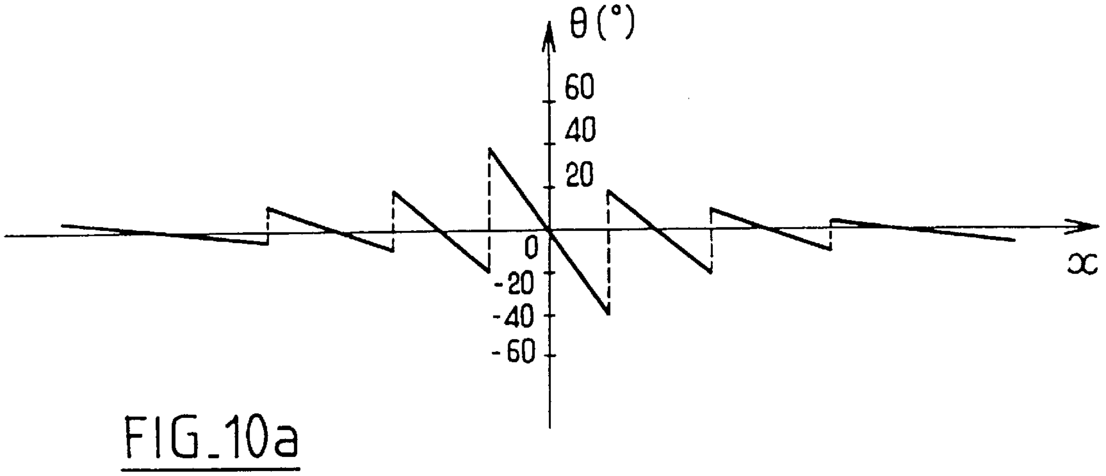
FIG. 10*a* is a graph showing the lateral distribution of light given by the reflector as an abscissa function, along the horizontal axial cross section of the reflector.
Figure 10B:
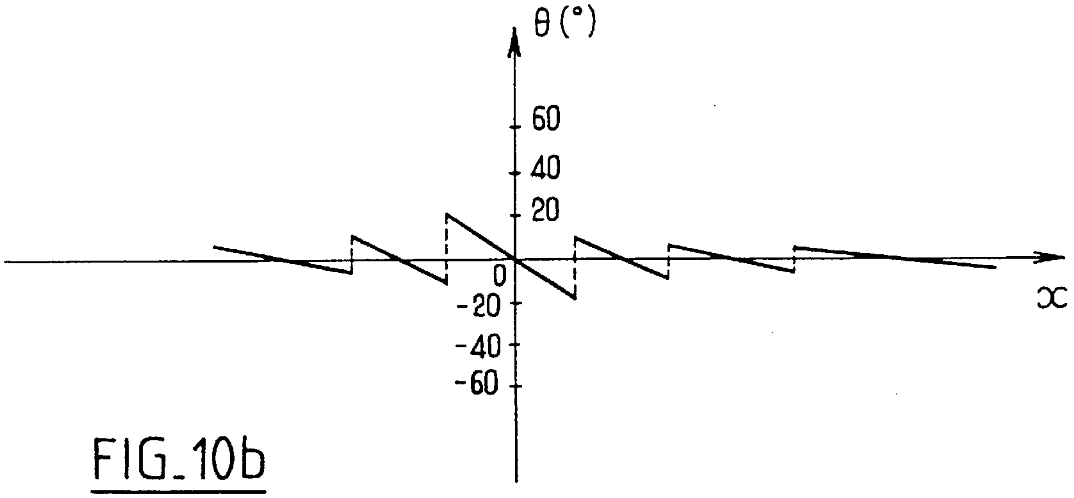

FIGS. 10*a* and 10*b* show optical behaviour which is characteristic of a reflector according to the present invention. These Figures show the horizontal deflection given at the point of reflection concerned, to the light emitted from the centre of the light source 10 (FIG. 1), this being denoted θ and measured with respect to the plane Y0Z, as a function of the abscissa or X-axis. FIG. 10*a* indicates the law of deflection at the point Z=0, while FIG. 10*b* indicates the law of deflection at a point Z which is different from zero, and which is for example equal to 30 mm for a reflector of conventional dimensions.

It will be observed first that, for each of the zones, the amplitude of the horizontal spread bears an inverse relationship with the distance from the axis 0Y of the reflector. It will also be noted that the amplitude of the spread varies with distance from the horizontal plane X0Y, and that this evolution is progressive because of the continuity of the surfaces in the vertical direction. This evolution may of course be in the sense of a diminution for some zones as above, with an increase for other zones.

What is claimed is:

1. A motor vehicle headlight reflector for reflecting light from a light source comprising:

- a center,
- a plurality of zones with smooth reflective surfaces,
- the zones being juxtaposed laterally to each other and defining transition lines with a break of slope joining each zone to the next,
- the zones being delimited by the transition lines,
- each zone being adapted to spread light from the light source between two limits of horizontal spread,
- each limit of horizontal spread in each zone varying progressively with displacement along the transition line concerned,
- wherein the smooth reflective surface of each of the zones close to the center of the reflector is defined by a non-parabolic horizontal generatrix and a vertical cross section giving progressive controlled upward and downward defocalization, the defocalization being adjusted to allow for progressive variation in the limits of horizontal spread.

2. The reflector according to claim 1, wherein the reflector further comprises adjacent zones bounding the center of the reflector, the limit of horizontal spread of light in at least one adjacent zone diminishing progressively upward and downward from the center.

3. The reflector according to claim 1, wherein the horizontal generatrices are designed to give spreading by divergence.

4. The reflector according to claim 3, wherein the reflector further comprises side edges, wherein the horizontal generatrices and the position of the transition lines of the zones are designed such that the limits of horizontal spread in each zone diminish progressively from the center towards the side edges.

5. The reflector according to claim 4, wherein the horizontal spread in each zone is symmetrical.

6. The reflector according to claim 4, wherein the horizontal spread in each zone is asymmetrical.

7. The reflector according to claim 1 having a horizontal cut-off line, wherein the reflective surface of at least some of the zones give a defocalization below and essentially level with the horizontal cut-off line.

8. The reflector according to claim 7 having a further cut-off line offset from the horizontal cut-off line and at least one further laterally juxtaposed zone wherein the reflective surface of the further laterally juxtaposed zone gives defocalization below and essentially level with the further cut-off line.

9. The reflector according to claim 8, wherein the further cut-off line is offset angularly from the horizontal cut-off line.

10. The reflector according to claim 8, wherein the further cut-off line is offset in height with respect to the horizontal cut-off line.

11. A method of making a motor vehicle headlight reflector comprising the steps of:

defining a plurality of reflective surfaces, each reflective surface having a non-parabolic horizontal generatrix and a vertical cross section giving progressive upward and downward defocalization;

adjusting the position of the horizontal generatrices and adjusting the defocalization of each reflective surface such that the reflective surfaces intersect along transition lines, and each reflective surface gives a horizontal spread which may be progressively varied;

machining a mold in which to mold the horizontally juxtaposed zones comprising the respective portions of the reflective surfaces bounded by the transition lines; and molding the reflector in the mold.

12. The method according to claim 11, wherein the step of adjusting the position of the horizontal generatrices is performed as a function of the required position, in the lateral direction, of the transition lines between the different zones.

13. The method according to claim 11, wherein the step of adjusting the defocalization is performed as a function of the required magnitude of the variation in horizontal spread along the transition lines.

14. A motor vehicle headlight comprising:

a light source, a reflector, and a cover lens, said reflector comprising a center and a plurality of laterally juxtaposed zones bounded by transition lines, said laterally juxtaposed zones having smooth reflective surfaces, said transition lines having a break of slope, and said smooth reflective surface of each of the zones close to the center of the reflector being defined by a non-parabolic horizontal generatrix.

15. A motor vehicle headlight comprising:

a light source, the motor vehicle headlight reflector of claim 1, and a cover lens.

16. The reflector according to claim 1 wherein the non-parabolic horizontal generatrix of each of the zones close to the center of the reflector is progressively less and less parabolic, the closer the zone is to the center of the reflector.

* * * * *